(12) United States Patent
Liu (10) Patent No.: US 11,509,966 B2
(45) Date of Patent: Nov. 22, 2022

(54) METHOD AND DEVICE FOR INFORMATION PROCESSING

(71) Applicant: BEIJING DAJIA INTERNET INFORMATION TECHNOLOGY CO., LTD., Beijing (CN)

(72) Inventor: Zhengyang Liu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/469,040

(22) Filed: Sep. 8, 2021

(65) Prior Publication Data
US 2022/0174364 A1 Jun. 2, 2022

(30) Foreign Application Priority Data
Nov. 27, 2020 (CN) .......................... 202011366942.3

(51) Int. Cl.
*H04N 21/472* (2011.01)
*H04N 21/442* (2011.01)
*H04N 21/454* (2011.01)
*G06Q 50/00* (2012.01)

(52) U.S. Cl.
CPC ....... *H04N 21/47202* (2013.01); *G06Q 50/01* (2013.01); *H04N 21/44226* (2020.08); *H04N 21/454* (2013.01)

(58) Field of Classification Search
CPC .......... H04N 21/4788; H04N 21/4756; H04N 21/252; H04N 21/84; H04N 21/4532; H04N 21/25891
See application file for complete search history.

(56) References Cited

U.S. PATENT DOCUMENTS

| 10,498,794 | B1 * | 12/2019 | Keighran | H04L 65/612 |
| 2003/0018979 | A1 * | 1/2003 | Hasegawa | H04N 21/4532 709/219 |
| 2008/0301232 | A1 * | 12/2008 | Facemire | H04L 12/1818 709/205 |
| 2009/0164484 | A1 * | 6/2009 | Horowitz | H04N 21/4532 |
| 2013/0212507 | A1 * | 8/2013 | Fedoseyeva | G06F 3/04842 715/765 |
| 2014/0012910 | A1 * | 1/2014 | White | H04N 21/4355 709/204 |
| 2014/0013200 | A1 * | 1/2014 | White | G06F 16/78 715/230 |

(Continued)

*Primary Examiner* — Jason Salce
(74) *Attorney, Agent, or Firm* — Foley & Lardner LLP (57) ABSTRACT

A method and device for information processing. A server receives an information acquisition request sent by a viewing account. The information acquisition request includes a target multimedia information identifier. In response to the information acquisition request, the server acquires a total quantity, a first quantity, a second quantity, and a third quantity of comments in a first comment set corresponding to the target multimedia information identifier. The server determines a first target quantity according to the total quantity, the first quantity, the second quantity, and the third quantity. The first target quantity is a quantity of comments allowed to be displayed to the viewing account in the first comment set. The server sends the first target quantity the viewing account.

15 Claims, 6 Drawing Sheets

(56) References Cited

U.S. PATENT DOCUMENTS

| | | | |
|---|---|---|---|
| 2015/0110470 A1* | 4/2015 | Zhang | G11B 27/11 |
| | | | 386/241 |
| 2015/0358658 A1* | 12/2015 | Murphy | H04N 21/854 |
| | | | 725/35 |
| 2016/0361646 A1* | 12/2016 | Perry | H04N 21/2668 |
| 2017/0182426 A1* | 6/2017 | Loeb | A63F 13/87 |
| 2017/0289619 A1* | 10/2017 | Xu | H04N 21/25866 |
| 2017/0289634 A1* | 10/2017 | E | H04N 21/4532 |
| 2017/0330261 A1* | 11/2017 | Ouyang | G06Q 30/0627 |
| 2018/0337880 A1* | 11/2018 | Sokolov | G11B 27/34 |
| 2019/0200078 A1* | 6/2019 | Bhattacharya | G11B 27/28 |
| 2020/0327176 A1* | 10/2020 | Zhang | G06F 16/958 |

\* cited by examiner

METHOD AND DEVICE FOR INFORMATION PROCESSING

CROSS-REFERENCE TO RELATED APPLICATIONS

This application claims priority to Chinese Patent Application No. 202011366942.3, titled "METHOD AND DEVICE FOR INFORMATION PROCESSING," filed on Nov. 27, 2020, the entire content of which is incorporated herein by reference in its entirety.

TECHNICAL FIELD

The present disclosure relates to the field of computer technologies, and in particular to systems, methods, apparatuses, and non-transitory computer readable media for information processing.

BACKGROUND

In content-related applications, comments are an important way to reflect users' opinions of the content being displayed. The comments play a vital role in subsequent searches, recommendations, and advertising. Therefore, many applications, such as video-sharing applications, are provided with the comment function. The users can see a list of comments and the number of comments in the video-sharing APP, and the number of comments indicates how many comments to a certain video are there.

In practical applications, most of applications will filter comments to a certain degree. For example, if an account A blacklists an account B, the account A cannot see the comments post by the account B. In addition, if the account posts an illegal comment, this comment can be set by an administrator or a system to be visible only to the comment author, and not visible to other accounts.

At present, the number of the comments displayed in the application is the number of global comments, and the number of the comments seen by all accounts is the same.

SUMMARY

According to some arrangements, a method for information processing includes receiving an information acquisition request sent by a viewing account, the information acquisition request including a target multimedia information identifier. The method further includes in response to the information acquisition request, acquiring a total quantity, a first quantity, a second quantity, and a third quantity of comments in a first comment set. The first comment set includes various comments posted by accounts for multimedia information corresponding to the target multimedia information identifier. The first quantity is a quantity of comments, each with a limited visible object, in the first comment set. The second quantity is a quantity of comments, each with a limited visible object and visible to the viewing account, in the first comment set. The third quantity is a quantity of comments blocked by the viewing account in the first comment set. The method further includes determining a first target quantity according to the total quantity, the first quantity, the second quantity, and the third quantity. The first target quantity is a quantity of comments allowed to be displayed to the viewing account in the first comment set. The method further includes sending the first target quantity to the viewing account.

According to some arrangements, an electronic device includes a processor and a memory for storing instructions executable by the processor. The processor is configured to execute the instructions to implement the method for information processing as described herein.

According to some arrangements, a non-transitory computer-readable storage medium having stored thereon instructions which, when being executed by a processor of an electronic device, cause the electronic device to carry out the method for information processing as described herein.

DETAILED DESCRIPTION

In order to enable those of ordinary skilled in the art to better understand the technical solutions of the present disclosure, the technical solutions in arrangements of the present disclosure will be described clearly and completely with reference to the accompanying drawings.

It should be noted that the terms "first" and "second" in the specification and claims of the present disclosure and the above-mentioned drawings are used to distinguish similar objects, and are not necessarily used to describe a specific order or sequence. It should be understood that the data used in this way can be interchanged under appropriate circumstances so that the arrangements of the present disclosure described herein can be implemented in an order other than those illustrated or described herein. The implementations set forth in the following arrangements do not represent all implementations consistent with the present disclosure. Instead, they are merely examples of devices and methods consistent with aspects related to the present disclosure as recited in the appended claims.

Figure 1:
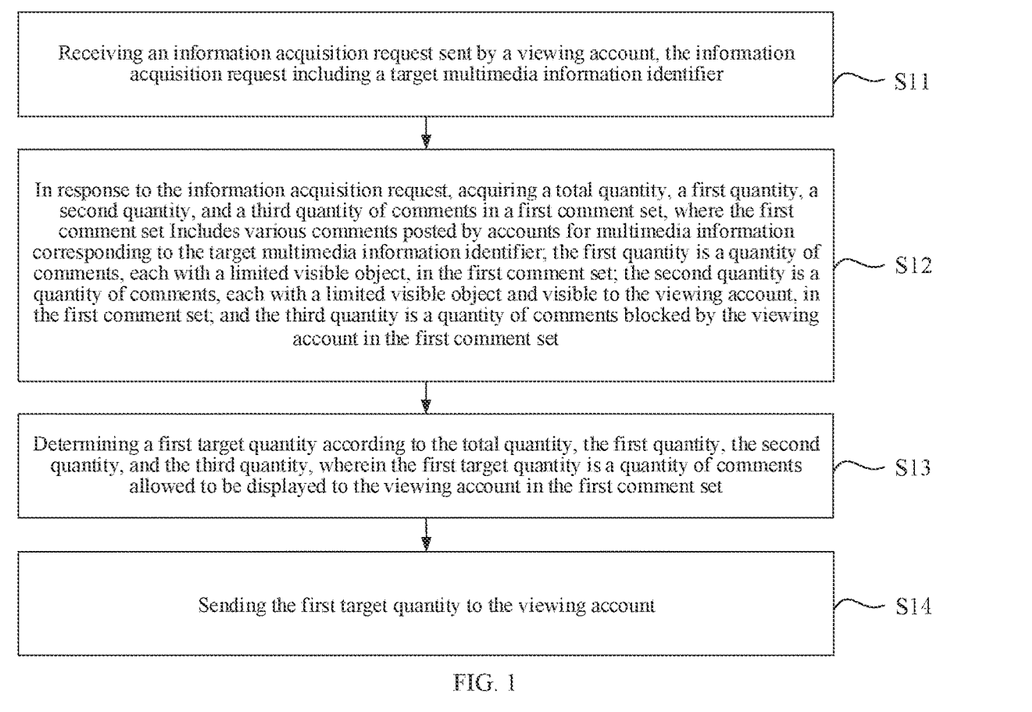
FIG. 1 is a flowchart showing a method for information processing according to an arrangement.

FIG. 1 is a flowchart showing a method for information processing according to an arrangement. The method can be executed by an electronic device, such as a server. As shown in FIG. 1, the method includes, at S11, receiving an information acquisition request sent by a viewing account, where the information acquisition request includes a target multimedia information identifier. At S12, in response to the information acquisition request, a total quantity, a first quantity, a second quantity, and a third quantity of comments in a first comment set are acquired. The first comment set includes various comments posted by accounts for multimedia information corresponding to the target multimedia information identifier. The first quantity is a quantity of comments, each with a limited visible object, in the first comment set. The second quantity is a quantity of comments, each with a limited visible object and visible to the viewing account, in the first comment set. The third quantity is a quantity of comments blocked by the viewing account in the first comment set. At S13, a first target quantity is determined according to the total quantity, the first quantity, the second quantity, and the third quantity. The first target quantity is a quantity of comments allowed to be displayed to the viewing account in the first comment set. At S14, the first target quantity is sent to the viewing account.

In some arrangements of the present disclosure, the multimedia information may include audio information, video information, image information, text information, and so on.

In some arrangements, in response to detecting by the viewing account that the information acquisition request is triggered by a user, for example, by performing a trigger operation to display the target multimedia information on a multimedia page, the viewing account sends the information acquisition request to the server, and the server receives the information acquisition request sent by the viewing account. The information acquisition request carries the target multimedia information identifier.

In some arrangements, the server may record the total quantity of all comments corresponding to respective multimedia information in advance in a statistical dimension of the multimedia information identifier, such as a video ID. In response to receiving the information acquisition request sent by the viewing account, the server can acquire the total quantity of all comments corresponding to the target multimedia information according to the target multimedia information identifier, that is, the total quantity of comments contained in the first comment set corresponding to the target multimedia information identifier, which is denoted as N0.

The server may record the quantity of comments corresponding to respective multimedia information, where each comment is with a limited visible object, in advance in the statistical dimension of the multimedia information identification, such as the video ID. In response to receiving the information acquisition request sent by the viewing account, the server can acquire, according to the target multimedia information identifier, the quantity of comments, each with the limited visible object, that is, the first quantity, which is denoted as N1. The comment with the limited visible object refers to the comment that is only visible to one or more objects, for example, a comment that is visible to only a comment account (an account that posts the comment) but invisible to other accounts.

The server may record the quantity of comments corresponding to respective multimedia information, where each comment is with a limited visible object and is visible to the viewing account, in advance in statistical dimensions of the multimedia information identifier such as the video ID, and an account identifier such as an account ID. In response to receiving the information acquisition request sent by the viewing account, the server can acquire, according to the target multimedia information identifier, the quantity of comments, each with the limited visible object and visible to the viewing account, in the first comment set corresponding to the target multimedia information identifier, i.e., the second quantity, which is denoted as N2.

In some arrangements, there are various implementations for the server to acquire the third quantity. For example, in some arrangements, the server may record the quantity of comments corresponding to respective multimedia information, where each comment is blocked by the viewing account, in advance in the statistical dimensions of the multimedia information identifier such as the video ID and the account identifier such as the account ID. In response to receiving the information acquisition request sent by the viewing account, the server can directly acquire the quantity of comments blocked by the viewing account in the first comment set, that is, the third quantity, which is denoted as N3.

In some arrangements, in response to receiving the information acquisition request sent by the viewing account, the server may acquire a second comment set for the viewing account. The second comment set includes comments blocked by the viewing account and multimedia information identifiers, such as the video IDs, corresponding to the comments. The server then counts the quantity of comments corresponding to the target multimedia information identifier in the second comment set to get the third quantity N3. The third quantity is the quantity of comments blocked by the viewing account in the first comment set, which is equal to the quantity of comments, the multimedia information identifier (such as the video ID) of which is the target multimedia information identifier (such as the target video ID), in the second comment set. In this way, the server may store the second comment set for the viewing account in advance. The process of acquiring the second comment set will be explained in detail in subsequent arrangements.

The comment blocked by the viewing account includes the comment posted by an account blocked by the viewing account. The account blocked by the viewing account includes an account with which a blocking association relationship (such as blacklisting) has been established based on a request of the viewing account.

The first target quantity is a quantity of comments that can be seen by the viewing account with respect to the target multimedia information.

In some arrangements, the first target quantity can be determined according to a formula of $N=N0-N1+N2-N3$, where N represents the first target quantity, N0 represents the total quantity, N1 represents the first quantity, N2 represents the second quantity, and N3 represents the third quantity.

After determining the first target quantity, the server sends the first target quantity to the viewing account for display.

In the method for information processing provided in arrangements of the present disclosure, the first target quantity, that is, the quantity of comments that can be displayed to the viewing account, is counted in multi-dimensions. For example, the first target quantity is determined according to the total quantity of comments for the target multimedia information, the quantity of comments, each of which is displayed to the limited visible object, the quantity of comments, each of which is displayed to the limited visible object and is visible to the viewing account, and the quantity of comments blocked by the viewing account. With this solution, the quantity of comments contained in the comment list seen by the viewing account can be accurately calculated, thus improving the accuracy of comment counting.

Figure 2:
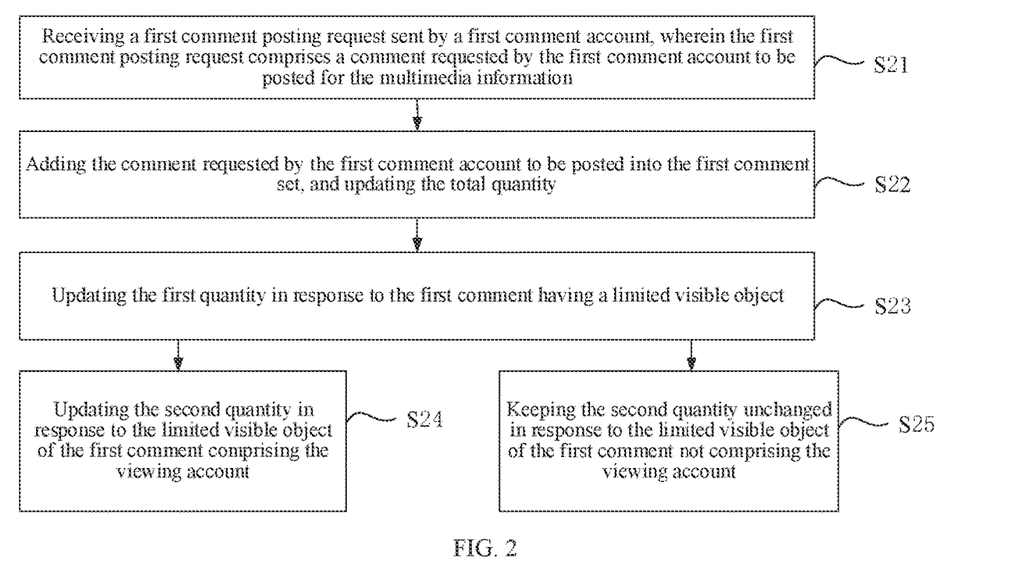
FIG. 2 is a flowchart of updating a quantity according to an exemplary arrangement.

In some arrangements, referring to FIG. 2, the method for information processing provided in arrangements of the present disclosure may further include, at S21, receiving a first comment posting request sent by a first comment account, where the first comment posting request includes a comment requested by the first comment account to be posted for the multimedia information. At S22, the comment requested by the first comment account to be posted into the first comment set is added, and the total quantity is updated.

In some arrangements, in response to detecting by a first comment account that the user triggers a first comment posting request, for example, by entering comment content and clicking a posting button, the first comment account sends the first comment posting request to the server, and the server receives the first comment posting request sent by the first comment account. The first comment posting request carries the comment requested by the first comment account to be posted for the target multimedia information.

In some arrangements, in response to receiving the first comment posting request sent by the first comment account, the server may add the comment requested by the first comment account to be posted into the first comment set corresponding to the target multimedia information identifier, and update the total quantity, for example, increase the total quantity by one.

In some arrangements, as shown in FIG. 2, the method may further include, at S23, updating the first quantity in response to the first comment having a limited visible object, at S24, updating the second quantity in response to the limited visible object of the first comment including the viewing account, and at S25, keeping the second quantity unchanged in response to the limited visible object of the first comment not including the viewing account.

In a case where the comment requested by the first comment account to be posted has the limited visible object, the first quantity may be updated. For example, the comment requested by the first comment account to be posted is illegal or contains advertising content, and this comment can be set by the administrator or the system to be visible only to the comment account, that is, the first comment account, but invisible to other accounts. In this case, the comment requested by the first comment account to be posted is the comment with the limited visible object in the first comment set. In such a case, the first quantity can be updated, for example, the first quantity is increased by one.

In some arrangements, in a case where the comment requested by the first comment account to be posted is only visible to the first comment account, and the viewing account is the same as the first comment account, the comment requested by the first comment account to be posted is the comment, which has the limited visible object and is visible to the viewing account, in the first comment set. In this case, the second quantity can be updated, for example, the second quantity is increased by one.

In a case where the comment requested by the first comment account to be posted is only visible to the first comment account, and the viewing account is different from the first comment account, the comment requested by the first comment account to be posted is the comment, which has the limited visible object, but the limited visible object does not include the viewing account, in the first comment set. In this case, the second quantity can be kept unchanged.

Figure 3:
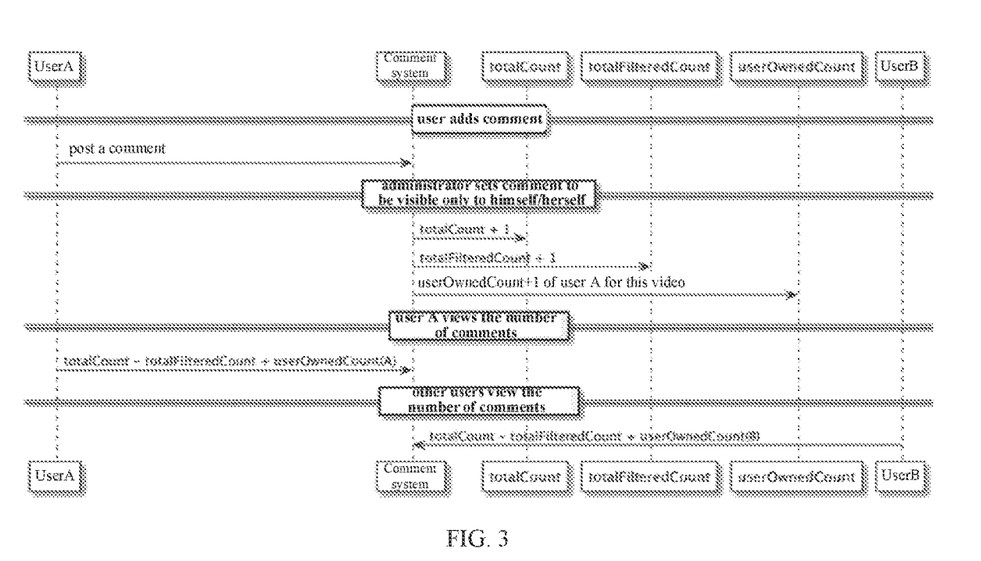
FIG. 3 is a schematic flowchart of updating a quantity according to an arrangement.

Referring to FIG. 3, the first comment account (user A) requests to post a comment to a target video, the first comment account sends the first comment posting request to the server (e.g., the comment system). The server receives the first comment posting request, and adds the comment requested to be posted by the user A into the first comment set. In this case, the server can increase the total quantity N0=totalCount by 1. In a case where the comment is set by the administrator to be only visible to himself/herself, that is, only visible to the user A, the first quantity N1=totalFilteredCount is also increased by 1.

In a case where the server counts the quantity of comments for the target video that can be seen by the user A, and the user A is the viewing account which is the same as the first comment account, the second quantity N2=userOwnedCount (A) is also increased by 1. Without considering the comment blocked by the user A, the quantity of the comments for the this video that can be seen by the user A is:

$$N(A) = totalCount - totalFilteredCount + userOwnedCount(A).$$

In a case where the server counts the quantity of comments for the target video that can be seen by a user B, and the user B is the viewing account which is different from the first comment account, the second quantity N2=userOwnedCount (B) remains unchanged. Without considering the comment blocked by the user B, the quantity of the comments for this video that can be seen by the user B is:

$$N(B) = totalCount - totalFilteredCount + userOwnedCount(B)$$

Therefore, for this target video, the quantity of the comments that can be seen by the user A is more than the quantity of the comments that can be seen by other users by one.

In arrangements of the present disclosure, when the first comment account posts the comment, values of the total quantity, the first quantity, and the second quantity are updated in real time, which can improve the real-time accuracy of the total quantity, the first quantity, and the second quantity, thus improving the accuracy of comment counting. In addition, by updating the total quantity, the first quantity, and the second quantity in real time, the efficiency of information processing can also be improved.

Figure 4:
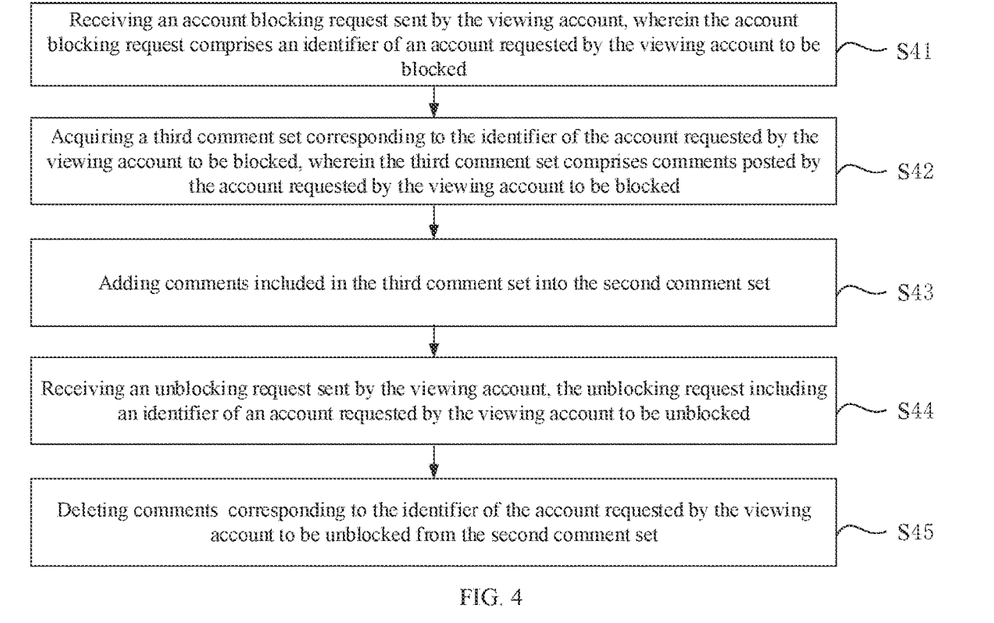
FIG. 4 is a flowchart of acquiring a second comment set according to an arrangement.

In some arrangements, referring to FIG. 4, the server can acquire the second comment set for the viewing account by, at S41, receiving an account blocking request sent by the viewing account, where the account blocking request includes an identifier of an account requested by the viewing account to be blocked. At S42, a third comment set corresponding to the identifier of the account requested by the viewing account to be blocked is acquired, where the third comment set includes comments posted by the account requested by the viewing account to be blocked. At S43, comments included in the third comment set are added into the second comment set.

In some arrangements, in response to detecting by the viewing account that the account blocking request is triggered by the user, such as by triggering an operation to blacklist an account, the viewing account sends the account blocking request to the server, and the server receives the account blocking request sent by the viewing account. The account blocking request carries the identifier of the account requested by the viewing account to be blocked, that is, the identifier of the account with which the viewing account requests to establish the blocking association relationship (such as blacklisting).

The server may store in advance sets of all comments posted by respective accounts in terms of the account identifiers. Each of the sets may include the comments posted by a corresponding account and the multimedia information identifiers corresponding to the comments. After receiving the account blocking request sent by the viewing account, the server can acquire, according to the identifier of the account requested by the viewing account to be blocked that is carried in the account blocking request, the third comment set corresponding to the identifier of the account requested by the viewing account to be blocked, thus acquiring all comments posted by the account requested by the viewing account to be blocked.

The comments contained in the third comment set include the comments posted by the account blocked by the viewing account, that is, the comments blocked by the viewing account. Therefore, the comments contained in the third comment set can be added to the second comment set.

Further, referring to FIG. 4, the server can further receive, at S44, an unblocking request sent by the viewing account, where the unblocking request includes an identifier of an account requested by the viewing account to be unblocked. At S45, the server deletes, from the second comment set, comments corresponding to the identifier of the account requested by the viewing account to be unblocked.

In some arrangements, in response to detecting that the unblocking request is triggered by the user, such as by triggering an operation to un-blacklist an account, the viewing account sends the unblocking request to the server, and the server receives the unblocking request sent by the viewing account. The unblocking request carries the identifier of the account requested by the viewing account to be unblocked, that is, the identifier of the account for which deletion of the blocking association relationship (such as un-blacklisting) is requested by the viewing account.

In some arrangements, in response to receiving the unblocking request sent by the viewing account, the server can delete, according to the identifier of the account requested by the viewing account to be unblocked that is carried in the unblocking request, the comment corresponding to the identifier of the account requested by the viewing account to be unblocked from the second comment set.

Figure 6:
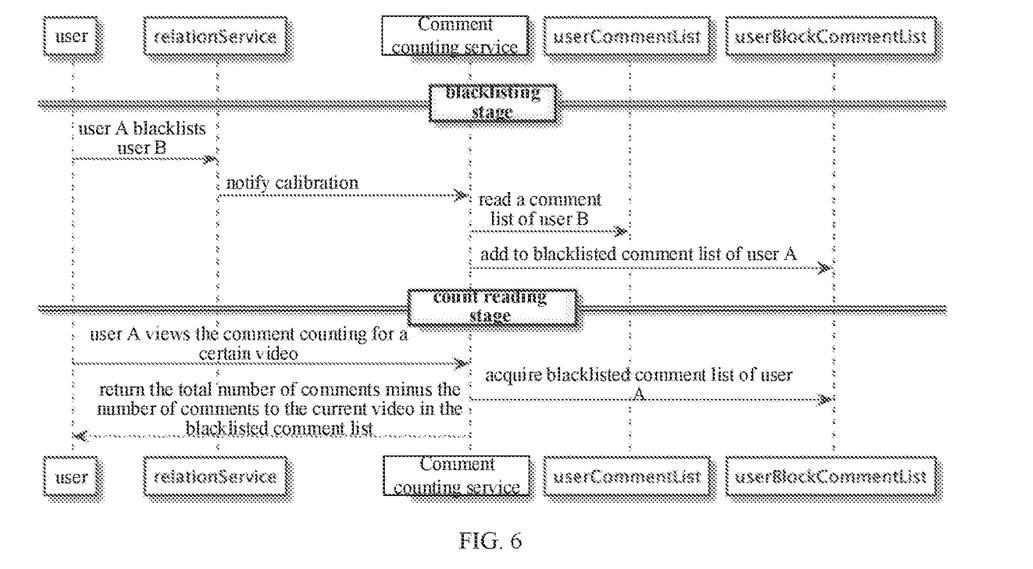
FIG. 6 is a schematic flowchart of acquiring a third quantity according to an arrangement.

Referring to FIG. 6, in the blacklisting stage, the viewing account (the user A) sends the account blocking request to the server (e.g., the relationService) to request to blacklist the user B. In response to receiving the account blocking request, the server (e.g., the comment counting service) acquires the set of all comments posted by the user B, that is, the third comment set (by reading the comment list of the user B), and add the comments in the third comment set to the second comment set (the blacklisted comment list for the user A).

In a count reading stage, the server acquires the blacklisted comment list for the user A. When the quantity of the comments for the current video seen by the user A is calculated, the server subtracts the quantity of the comments for the current video in the blacklisted comment list for the user A from the total quantity of the comments for the current video.

In some arrangements, by separately storing the comments blocked by the viewing account in the second comment set, and updating the second comment set in real time in response to the account blocking request or unblocking request sent by the viewing account, the real-time accuracy of the second quantity can be ensured, thus improving the accuracy of the comment counting. In addition, by updating the second quantity in real time, the efficiency of information processing can also be improved.

Figure 5:
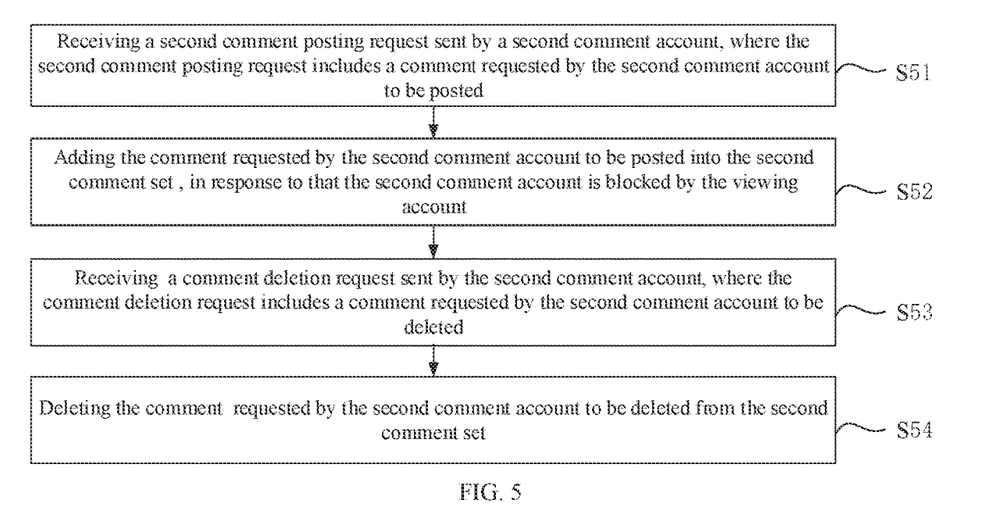
FIG. 5 is another flowchart of acquiring a second comment set according to an arrangement.

In other arrangements, referring to FIG. 5, the server can acquire the second comment set for the viewing account by, at S51, receiving a second comment posting request sent by a second comment account, where the second comment posting request includes a comment requested by the second comment account to be posted, and at S52, adding the comment requested by the second comment account to be posted into the second comment set, in response to that the second comment account is blocked by the viewing account.

In some arrangements, in response to detecting that the second comment posting request is triggered by the user, for example, by inputting the comment content and tapping the posting button, the second comment account sends the second comment posting request to the server, and the server receives the second comment posting request sent by the second comment account. The second comment posting request includes the comment requested by the second comment account to be posted.

In a case where the blocking association relationship with the second comment account is established based on a request of the viewing account (for example, the second comment account is blacklisted by the viewing account), in response to receiving the second comment posting request sent by the second comment account, the server can add the comment requested by the second comment account to be posted into the second comment set, since the comment requested by the second comment account to be posted is the comment posted by the account blocked by the viewing account, that is, the comment blocked by the viewing account.

In some arrangements, referring to FIG. 5, the server can further receive, at S53, a comment deletion request sent by the second comment account, where the comment deletion request includes a comment requested by the second comment account to be deleted and delete, at S54, from the second comment set, the comment requested by the second comment account to be deleted.

In some arrangements, in response to detecting that the comment deletion request is triggered by the user, such as by tapping the comment deletion button, the second comment account sends the comment deletion request to the server, and the server receives the comment deletion request sent by the second comment account. The comment deletion request includes the comment requested by the second comment account to be deleted.

In some arrangements, in response to receiving the comment deletion request sent by the second comment account, the server may delete the comment requested by the second comment account to be deleted, from the second comment set.

In some arrangements, by separately storing the comments blocked by the viewing account in the second comment set, and updating the second comment set in real time when the account blocked by the viewing account posts a comment or deletes a comment, the real-time accuracy of the second quantity can be ensured, thus improving the accuracy of comment counting. In addition, by updating the second quantity in real time, the efficiency of information processing can also be improved.

Figure 7:
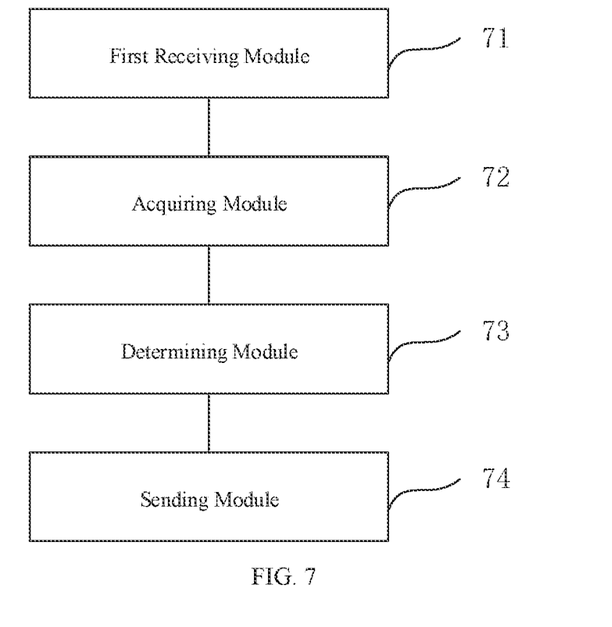
FIG. 7 is a structural block diagram showing a device for information processing according to an arrangement.

FIG. 7 is a block diagram showing a device for information processing according to an arrangement. Referring to FIG. 7, the device may include a first receiving module 71, an acquiring module 72, a determining module 73, and a sending module 74.

The first receiving module 71 is configured to receive an information acquisition request sent by a viewing account, wherein the information acquisition request includes a target multimedia information identifier.

The acquiring module 72 is configured to acquire a total quantity, a first quantity, a second quantity, and a third quantity of comments in a first comment set in response to the information acquisition request, wherein the first comment set includes various comments posted by accounts for multimedia information corresponding to the target multimedia information identifier; the first quantity is a quantity of comments, each with a limited visible object, in the first comment set; the second quantity is a quantity of comments, each with a limited visible object and visible to the viewing account, in the first comment set; and the third quantity is a quantity of comments blocked by the viewing account in the first comment set.

The determining module 73 is configured to determine a first target quantity according to the total quantity, the first quantity, the second quantity, and the third quantity, wherein the first target quantity is a quantity of comments that can be displayed to the viewing account in the first comment set.

The sending module 74 is configured to send the first target quantity to the viewing account.

In some arrangements, the device further includes a second receiving module and a first update module.

The second receiving module is configured to receive a first comment posting request sent by a first comment account, wherein the first comment posting request includes a comment requested by the first comment account to be posted for the multimedia information.

The first update module is configured to add the comment requested by the first comment account to be posted into the first comment set, and update the total quantity.

In some arrangements, the device further includes a second update module, a third update module and a keeping module.

The second update module is configured to update the first quantity in response to the first comment having a limited visible object.

The third update module is configured to update the second quantity in response to the limited visible object of the first comment including the viewing account.

The keeping module is configured to keep the second quantity unchanged in response to the limited visible object of the first comment not including the viewing account.

In some arrangements, the acquiring module includes an acquiring unit and a counting unit.

The acquiring unit is configured to acquire a second comment set for the viewing account, wherein the second comment set includes comments blocked by the viewing account and multimedia information identifiers corresponding to the comments.

The counting unit is configured to obtain the third quantity by counting a quantity of comments corresponding to the target multimedia information identifier in the second comment set.

In some arrangements, the acquiring unit is configured to:
receive an account blocking request sent by the viewing account, wherein the account blocking request includes an identifier of an account requested by the viewing account to be blocked;
acquire a third comment set corresponding to the identifier of the account requested by the viewing account to be blocked, wherein the third comment set includes comments posted by the account requested by the viewing account to be blocked; and
add comments included in the third comment set into the second comment set.

In some arrangements, the second comment set further includes account identifiers corresponding to the comments, and the acquiring unit is configured to:
receive an unblocking request sent by the viewing account, wherein the unblocking request includes an identifier of an account requested by the viewing account to be unblocked; and
delete comments corresponding to the identifier of the account requested by the viewing account to be unblocked from the second comment set.

In some arrangements, the acquiring unit is configured to:
receive a second comment posting request sent by a second comment account, wherein the second comment posting request includes a comment requested by the second comment account to be posted; and
add the comment requested by the second comment account to be posted into the second comment set in response to that the second comment account is blocked by the viewing account.

In some arrangements, the acquiring unit is further configured to:
receive a comment deletion request sent by the second comment account, wherein the comment deletion request includes a comment requested by the second comment account to be deleted; and
delete the comment requested by the second comment account to be deleted from the second comment set.

In some arrangements, the determining module is configured to:
determine the first target quantity according to a formula of $N=N0-N1+N2-N3$, where $N$ represents the first target quantity, $N0$ represents the total quantity, $N1$ represents the first quantity, $N2$ represents the second quantity, and $N3$ represents the third quantity.

Regarding the device in the foregoing arrangements, the specific manners in which each module performs operation has been described in detail in the method arrangements, which will not be repeated here.

Figure 8:
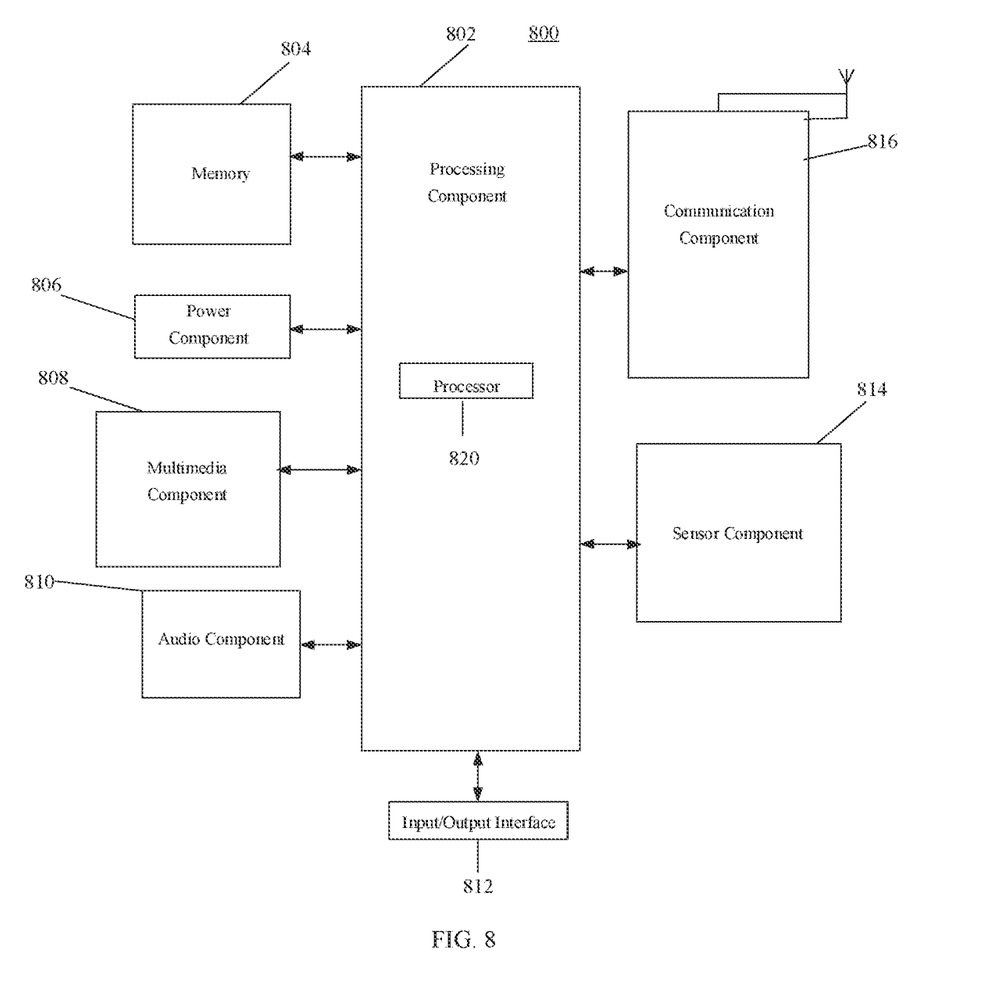
FIG. 8 is a block diagram showing an electronic device according to an arrangement.

FIG. 8 is a block diagram of an electronic device 800 shown in the present disclosure. For example, the electronic device 800 may be a mobile phone, a computer, a digital broadcasting terminal, a messaging device, a game console, a tablet device, a medical device, a fitness device, a personal digital assistant, etc.

Referring to FIG. 8, the electronic device 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls the overall operations of the electronic device 800, such as the operations associated with display, telephone calls, data communications, camera operations, and recording operations. The processing component 802 can include one or more processors 820 to execute instructions to perform all or part of the steps of the method for information processing in any of the arrangements described above. Moreover, the processing component 802 can include one or more modules to facilitate the interaction between the processing component 802 and other components. For example, the processing component 802 can include a multimedia module to facilitate the interaction between the multimedia component 808 and the processing component 802.

The memory 804 is configured to store various types of data to support the operations on the electronic device 800. Examples of such data include instructions for any application or method operated on electronic device 800, contact data, phone book data, messages, pictures, videos, and so on. The memory 804 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the electronic device 800. The power component 806 can include a power management system, one or more power sources, and other components associated with the generation, management, and distribution of power in the electronic device 800.

The multimedia component 808 includes a screen providing an output interface between the electronic device 800 and the user t. In some arrangements, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some arrangements, the multimedia component 808 includes a front camera and/or a rear camera. When the electronic device 800 is in an operation mode, such as a photographing mode or a video mode, the front camera and/or the rear camera can receive external multimedia data. Each of the front camera and the rear camera may be a fixed optical lens system or have focus and optical zoom capability.

The audio component 810 is configured to output and/or input an audio signal. For example, the audio component 810 includes a microphone (MIC) configured to receive an external audio signal when the electronic device 800 is in an operation mode, such as a call mode, a recording mode, and a voice recognition mode. The received audio signal may be further stored in the memory 804 or sent via the communication component 816. In some arrangements, the audio component 810 also includes a speaker for outputting the audio signal.

The I/O interface 812 provides an interface between the processing component 802 and peripheral interface modules, such as a keyboard, a click wheel, buttons, or the like. These buttons may include, but are not limited to, a home button, a volume button, a starting button, and a locking button.

The sensor component 814 includes one or more sensors for providing status assessments of various aspects of the electronic device 800. For example, the sensor component 814 can detect an open/closed state of the electronic device 800, relative positioning of components, such as the display and the keypad of the electronic device 800. The sensor component 814 can also detect a change in position of a component of the electronic device 800 or the electronic device 800, the presence or absence of user contact with the electronic device 800, an orientation, or an acceleration/deceleration of the electronic device 800, and a change in temperature of the electronic device 800. The sensor component 814 can include a proximity sensor configured to detect the presence of nearby objects without any physical contact. The sensor component 814 can also include a light sensor, such as a CMOS or CCD image sensor, configured to be used in imaging applications. In some arrangements, the sensor component 814 can also include an accelerometer sensor, a gyroscope sensor, a magnetic sensor, a pressure sensor, or a temperature sensor.

The communication component 816 is configured to facilitate wired or wireless communication between the electronic device 800 and other devices. The electronic device 800 can access a wireless network based on a communication standard, such as Wi-Fi, an operator network (such as 2G, 3G, 4G or 5G), or a combination thereof. In an arrangement, the communication component 816 receives broadcast signals or broadcast-related information from an external broadcast management system via a broadcast channel. In an arrangement, the communication component 816 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, or other technologies.

In an arrangement, the electronic device 800 may be implemented with one or more application specific integrated circuits (ASICs), digital signal processors (DSPs), digital signal processing devices (DSPDs), programmable logic devices (PLDs), field programmable Gate arrays (FPGAs), controllers, microcontrollers, microprocessors or other electronic components, which are used to perform the method for information processing according to any of the arrangements.

In an arrangement, there is also provided a non-transitory computer-readable storage medium including instructions, such as a memory 804 including instructions, the instructions can be executed by the processor 820 of the electronic device 800 to perform the method for information processing according to any of the arrangements. For example, the non-transitory computer readable storage medium may be a ROM, a random access memory (RAM), a CD-ROM, a magnetic tape, a floppy disc, and an optical data storage device.

In an arrangement, there is also provided a computer program product. The computer program product includes readable program codes which can be executed by the processor 820 of the device 800 to complete the method for information processing described in any of the arrangements. Optionally, the program codes may be stored in a storage medium of the device 800, and the storage medium may be a non-transitory computer-readable storage medium. For example, the non-transitory computer-readable storage medium may be a ROM, a random access memory (RAM), a CD-ROM, a magnetic tape, a floppy disc, and an optical data storage device.

Figure 9:
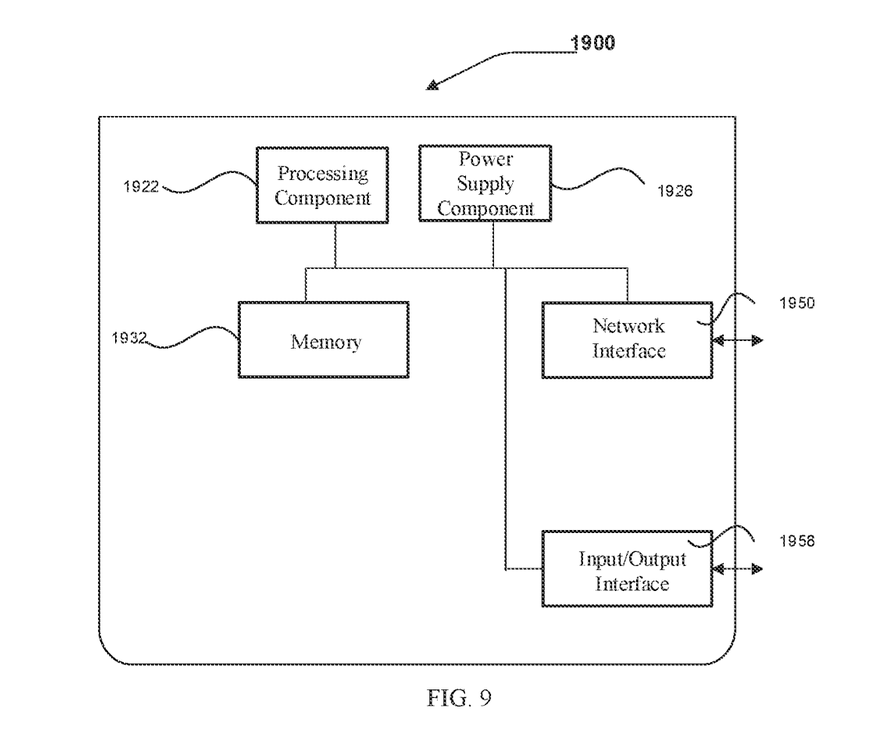
FIG. 9 is a block diagram showing an electronic device according to an arrangement.

FIG. 9 is a block diagram of an electronic device 1900 shown in the present disclosure. For example, the electronic device 1900 may be provided as a server.

Referring to FIG. 9, the electronic device 1900 includes a processing component 1922, which further includes one or more processors, and memory resources represented by a memory 1932 for storing instructions (such as an application program) executable by the processing component 1922. The application program stored in the memory 1932 may include one or more modules each corresponding to a set of instructions. In addition, the processing component 1922 is configured to execute instructions to perform the method for information processing described in any of the arrangements.

The electronic device 1900 may also include a power supply component 1926 configured to perform power management of the electronic device 1900, a wired or wireless network interface 1950 configured to connect the device 900 to a network, and an input/output (I/O) interface 1958. The electronic device 1900 can operate based on an operating system stored in the memory 1932, such as Windows Server™, Mac OS X™, Unix™, Linux™, FreeBSD™ or the like.

Other arrangements of the present disclosure will be readily devised by those skilled in the art after consideration of the specification and practice of the present disclosure disclosed herein. The present disclosure is intended to cover any variations, uses, or adaptations of the present disclosure, which follow the general principles of the present disclosure and include common knowledge or conventional technical measures in the art that are not disclosed in the present disclosure. The specification and arrangements are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A method for information processing, comprising:
   receiving, by a processor, an information acquisition request sent by a viewing account, wherein the information acquisition request comprises a target multimedia information identifier;
   in response to the information acquisition request, acquiring, by the processor, a total quantity, a first quantity, a second quantity, and a third quantity of comments in a first comment set, wherein the first comment set comprises various comments posted by accounts for multimedia information corresponding to the target multimedia information identifier; the first quantity is a quantity of comments, each with a limited visible object, in the first comment set; the second quantity is a quantity of comments, each with a limited visible object and visible to the viewing account, in the first comment set; and the third quantity is a quantity of comments blocked by the viewing account in the first comment set;
   determining, by the processor, a first target quantity according to the total quantity, the first quantity, the second quantity, and the third quantity, wherein the first target quantity is a quantity of comments allowed to be displayed to the viewing account in the first comment set;
   sending, by the processor, the first target quantity to the viewing account
   receiving, by the processor, a first comment posting request sent by a first comment account, wherein the first comment posting request comprises a comment requested by the first comment account to be posted for the multimedia information;
   adding, by the processor, the comment requested by the first comment account to be posted into the first comment set, and updating the total quantity;
   updating, by the processor, the first quantity in response to the first comment having a limited visible object;
   updating, by the processor, the second quantity in response to the limited visible object of the first comment comprising the viewing account; and
   keeping, by the processor, the second quantity unchanged in response to the limited visible object of the first comment not comprising the viewing account.

2. The method according to claim 1, wherein said acquiring the third quantity comprises:
   acquiring a second comment set for the viewing account, wherein the second comment set comprises comments blocked by the viewing account and multimedia information identifiers corresponding to the comments; and
   obtaining the third quantity by counting a quantity of comments corresponding to the target multimedia information identifier in the second comment set.

3. The method according to claim 2, wherein said acquiring the second comment set for the viewing account comprises:
   receiving an account blocking request sent by the viewing account, wherein the account blocking request comprises an identifier of an account requested by the viewing account to be blocked;
   acquiring a third comment set corresponding to the identifier of the account requested by the viewing account to be blocked, wherein the third comment set comprises comments posted by the account requested by the viewing account to be blocked; and
   adding comments included in the third comment set into the second comment set.

4. The method according to claim 2, wherein said acquiring the second comment set for the viewing account comprises:
   receiving an unblocking request sent by the viewing account, wherein the unblocking request comprises an identifier of an account requested by the viewing account to be unblocked; and
   deleting, from the second comment set, comments corresponding to the identifier of the account requested by the viewing account to be unblocked.

5. The method according to claim 2, wherein said acquiring the second comment set for the viewing account comprises:
   receiving a second comment posting request sent by a second comment account, wherein the second comment posting request comprises a comment requested by the second comment account to be posted; and
   adding the comment requested by the second comment account to be posted into the second comment set, in response to that the second comment account is blocked by the viewing account.

6. The method according to claim 5, further comprising:
   receiving a comment deletion request sent by the second comment account, wherein the comment deletion request comprises a comment requested by the second comment account to be deleted; and
   deleting, from the second comment set, the comment requested by the second comment account to be deleted.

7. The method according to claim 1, wherein said determining the first target quantity according to the total quantity, the first quantity, the second quantity, and the third quantity, comprises:
   determining the first target quantity according to a formula of $$N = N0 - N1 + N2 - N3,$$

where N represents the first target quantity, N0 represents the total quantity, N1 represents the first quantity, N2 represents the second quantity, and N3 represents the third quantity.

8. A device for information processing, comprising:
   a processor; and
   a memory configured to store instructions executable by the processor,
   wherein the processor is configured to execute the instructions to:

receive an information acquisition request sent by a viewing account, wherein the information acquisition request comprises a target multimedia information identifier;

in response to the information acquisition request, acquire a total quantity, a first quantity, a second quantity, and a third quantity of comments in a first comment set, wherein the first comment set comprises various comments posted by accounts for multimedia information corresponding to the target multimedia information identifier; the first quantity is a quantity of comments, each with a limited visible object, in the first comment set; the second quantity is a quantity of comments, each with a limited visible object and visible to the viewing account, in the first comment set; and the third quantity is a quantity of comments blocked by the viewing account in the first comment set;

determine a first target quantity according to the total quantity, the first quantity, the second quantity, and the third quantity, wherein the first target quantity is a quantity of comments allowed to displayed to the viewing account in the first comment set;

send the first target quantity to the viewing account receive a first comment posting request sent by a first comment account, wherein the first comment posting request comprises a comment requested by the first comment account to be posted for the multimedia information; and add the comment requested by the first comment account to be posted into the first comment set, and update the total quantity;

update the first quantity in response to the first comment having a limited visible object;

update the second quantity in response to the limited visible object of the first comment comprising the viewing account; and keep the second quantity unchanged in response to the limited visible object of the first comment not comprising the viewing account.

9. The device according to claim 8, wherein the processor is further configured to:

acquire a second comment set for the viewing account, wherein the second comment set comprises comments blocked by the viewing account and multimedia information identifiers corresponding to the comments; and obtain the third quantity by counting a quantity of comments corresponding to the target multimedia information identifier in the second comment set.

10. The device according to claim 9, wherein the processor is further configured to:

receive an account blocking request sent by the viewing account, wherein the account blocking request comprises an identifier of an account requested by the viewing account to be blocked;

acquire a third comment set corresponding to the identifier of the account requested by the viewing account to be blocked, wherein the third comment set comprises comments posted by the account requested by the viewing account to be blocked; and add comments included in the third comment set into the second comment set.

11. The device according to claim 9, wherein the processor is further configured to:

receive an unblocking request sent by the viewing account, wherein the unblocking request comprises an identifier of an account requested by the viewing account to be unblocked; and delete, from the second comment set, comments corresponding to the identifier of the account requested by the viewing account to be unblocked.

12. The device according to claim 9, wherein the processor is further configured to:

receive a second comment posting request sent by a second comment account, wherein the second comment posting request comprises a comment requested by the second comment account to be posted; and add the comment requested by the second comment account to be posted into the second comment set in response to that the second comment account is blocked by the viewing account.

13. The device according to claim 12, wherein the processor is further configured to:

receive a comment deletion request sent by the second comment account, wherein the comment deletion request comprises a comment requested by the second comment account to be deleted; and delete, from the second comment set, the comment requested by the second comment account to be deleted.

14. The device according to claim 8, wherein the processor is further configured to:

determine the first target quantity according to a formula of $N=N0-N1+N2-N3$, where N represents the first target quantity, N0 represents the total quantity, N1 represents the first quantity, N2 represents the second quantity, and N3 represents the third quantity.

15. A non-transitory computer-readable storage medium having stored thereon instructions which, when being executed by a processor of an electronic device, cause the electronic device to:

receive an information acquisition request sent by a viewing account, wherein the information acquisition request comprises a target multimedia information identifier;

in response to the information acquisition request, acquire a total quantity, a first quantity, a second quantity, and a third quantity of comments in a first comment set, wherein the first comment set comprises various comments posted by accounts for multimedia information corresponding to the target multimedia information identifier; the first quantity is a quantity of comments, each with a limited visible object, in the first comment set; the second quantity is a quantity of comments, each with a limited visible object and visible to the viewing account, in the first comment set; and the third quantity is a quantity of comments blocked by the viewing account in the first comment set;

determine a first target quantity according to the total quantity, the first quantity, the second quantity, and the third quantity, wherein the first target quantity is a quantity of comments allowed to displayed to the viewing account in the first comment set;

send the first target quantity to the viewing account;

receive a first comment posting request sent by a first comment account, wherein the first comment posting request comprises a comment requested by the first comment account to be posted for the multimedia information; and add the comment requested by the first comment account to be posted into the first comment set, and update the total quantity;

update the first quantity in response to the first comment having a limited visible object;

update the second quantity in response to the limited visible object of the first comment comprising the viewing account; and keep the second quantity unchanged in response to the limited visible object of the first comment not comprising the viewing account.

\* \* \* \* \*